(12) United States Patent
Uysal et al.

(10) Patent No.: US 11,748,766 B2
(45) Date of Patent: Sep. 5, 2023

(54) SYSTEM AND METHOD FOR ROBUST, MODULAR, PRODUCT SENSITIVE MONITORING AND ENCODING OF QUALITY AND SAFETY ALONG THE PERISHABLE SUPPLY CHAIN

(71) Applicants: University of South Florida, Tampa, FL (US); DeltaTrak, Inc., Pleasanton, CA (US)

(72) Inventors: Ismail Uysal, Lakeland, FL (US); Frederick Louis Wu, Danville, CA (US)

(73) Assignees: University of South Florida, Tampa, FL (US); DeltaTrak, Inc., Pleasanton, FL (US)

( * ) Notice: Subject to any disclaimer, the term of this patent is extended or adjusted under 35 U.S.C. 154(b) by 694 days.

(21) Appl. No.: 16/431,388

(22) Filed: Jun. 4, 2019

(65) Prior Publication Data

US 2019/0370817 A1    Dec. 5, 2019

Related U.S. Application Data

(60) Provisional application No. 62/680,390, filed on Jun. 4, 2018.

(51) Int. Cl.
*G06Q 30/018* (2023.01)
*G06Q 10/0832* (2023.01)

(52) U.S. Cl.
CPC ....... *G06Q 30/018* (2013.01); *G06Q 10/0832* (2013.01)

(58) Field of Classification Search
CPC .............................. G06N 3/045; G06N 3/084
(Continued)

(56) References Cited

U.S. PATENT DOCUMENTS

| | | | | |
|---|---|---|---|---|
| 4,276,112 A | * | 6/1981 | French | B65C 9/188 156/542 |
| 5,161,384 A | * | 11/1992 | Hanson | F25D 29/003 62/130 |

(Continued)

FOREIGN PATENT DOCUMENTS

WO    2018017824 A1    1/2018

OTHER PUBLICATIONS

Balogun, et al., Mini Review: Artificial Neural Network Application on fruit and Vegetables Quality Assessment, 2014, International Journal of Scientific & Engineering Research, vol. 5, Issue 6, Jun. 2014. (Year: 2014).*

(Continued)

*Primary Examiner* — Sarah M Monfeldt
*Assistant Examiner* — John S. Wasaff
(74) *Attorney, Agent, or Firm* — Molly L. Sauter; Smith & Hopen, P.A.

(57) ABSTRACT

A system and method for assessing a supply chain for a perishable product. In various embodiments, the present invention provides a quality code for a perishable product which encodes a plurality of the most important performance metrics of the cold chain for the perishable product, including food quality oriented measures such as cut-to-cool time, transportation quality and accumulated shelf-life loss, and food safety oriented measures such as most probable number range for microorganism growth into a compact, modular and simple to read format.

20 Claims, 10 Drawing Sheets

(58) Field of Classification Search
USPC .......................................................... 705/317
See application file for complete search history.

(56) References Cited

U.S. PATENT DOCUMENTS

| | | | | |
|---|---|---|---|---|
| 5,442,669 | A * | 8/1995 | Medin | G07C 3/04 377/25 |
| 5,802,015 | A * | 9/1998 | Rothschild | G09F 3/02 116/202 |
| 6,230,780 | B1 * | 5/2001 | Rietheimer | B65C 11/006 156/577 |
| 7,130,814 | B1 * | 10/2006 | Szabo | G06Q 30/0201 705/7.29 |
| 7,495,558 | B2 * | 2/2009 | Pope | G01K 1/024 340/572.1 |
| 9,693,851 | B2 * | 7/2017 | Tessmer | A61F 2/0105 |
| 9,824,298 | B1 * | 11/2017 | Krishnan Gorumkonda | G06Q 10/0832 |
| 2002/0011567 | A1 * | 1/2002 | Ozanich | G01J 3/0224 250/326 |
| 2003/0205412 | A1 * | 11/2003 | Hewitt | G06F 40/166 177/25.15 |
| 2003/0216969 | A1 * | 11/2003 | Bauer | G06K 17/00 705/22 |
| 2004/0021706 | A1 * | 2/2004 | Lenthall | B65C 9/46 347/2 |
| 2004/0124977 | A1 * | 7/2004 | Biffar | G08G 1/20 340/8.1 |
| 2004/0130714 | A1 * | 7/2004 | Gellerman | G01J 3/44 356/300 |
| 2004/0156418 | A1 * | 8/2004 | Debord | G01K 3/04 374/103 |
| 2005/0248455 | A1 * | 11/2005 | Pope | G06K 19/0717 374/E1.004 |
| 2005/0261991 | A1 * | 11/2005 | Kennamer | G06Q 10/08 705/28 |
| 2006/0061454 | A1 * | 3/2006 | Debord | G01K 7/16 374/E3.004 |
| 2006/0291935 | A1 * | 12/2006 | Plecas | B41J 3/4075 400/76 |
| 2007/0089433 | A1 * | 4/2007 | McDonnell | A23L 3/00 62/115 |
| 2007/0221727 | A1 * | 9/2007 | Reznik | G06Q 10/08 235/383 |
| 2007/0273507 | A1 * | 11/2007 | Burchell | G01K 3/04 340/572.1 |
| 2008/0052044 | A1 * | 2/2008 | Shoenfeld | G07C 9/00896 229/300 |
| 2008/0073432 | A1 * | 3/2008 | Barenburg | G06Q 10/08 235/385 |
| 2008/0186175 | A1 * | 8/2008 | Stern | G01J 5/0265 340/572.1 |
| 2008/0294488 | A1 * | 11/2008 | Gupta | G06Q 10/06393 705/37 |
| 2009/0303052 | A1 * | 12/2009 | Aklepi | G06Q 10/08 340/573.2 |
| 2010/0332407 | A1 | 12/2010 | Grieve et al. | |
| 2011/0029413 | A1 * | 2/2011 | Ben-Tzur | G06Q 10/087 705/28 |
| 2014/0046722 | A1 * | 2/2014 | Rosenbloom | G16H 40/20 705/7.28 |
| 2014/0122156 | A1 * | 5/2014 | Jung | G06Q 10/06313 705/7.23 |
| 2014/0147015 | A1 * | 5/2014 | Bajema | G06T 7/0004 382/110 |
| 2014/0180953 | A1 * | 6/2014 | Westcott | G06Q 10/0832 705/332 |
| 2015/0102100 | A1 * | 4/2015 | Hattrup | G06K 1/121 53/64 |
| 2015/0120597 | A1 * | 4/2015 | Dertadian | F25D 3/08 705/332 |
| 2015/0347945 | A1 * | 12/2015 | Reese | G06Q 10/06395 705/7.23 |
| 2016/0012337 | A1 * | 1/2016 | Kaye | G06N 20/00 706/46 |
| 2016/0196527 | A1 | 7/2016 | Bose et al. | |
| 2017/0336126 | A1 * | 11/2017 | Winkle | B65D 81/18 |
| 2018/0025185 | A1 * | 1/2018 | Hattrup | G06K 15/024 705/14.1 |
| 2018/0031296 | A1 * | 2/2018 | Winkle | F25D 11/003 |
| 2018/0088098 | A1 | 3/2018 | Mandava et al. | |
| 2018/0174094 | A1 * | 6/2018 | Ren | H04L 9/3239 |
| 2019/0137162 | A1 * | 5/2019 | Ominsky | F25D 29/003 |
| 2019/0213532 | A1 * | 7/2019 | Brightwell | G06Q 10/087 |
| 2019/0235538 | A1 * | 8/2019 | Yost | G06Q 10/0832 |

OTHER PUBLICATIONS

YourDictionary.com, Examples of Vector and Scalar Quantity in Physics, YourDictionary.com via web.archive.org link dated May 13, 2018 (Year: 2018).*

VarsityTutors.com, High School Physics: Understanding Scalar and Vector Quantities, VarsityTutors.com via web.archive.org link dated Nov. 10, 2016 (Year: 2016).*

Montanari, R. (2008). Cold chain tracking: a managerial perspective. Trends in Food Science & Technology, 19(8), 425-431. (Year: 2008).*

International Search Report and Written Opinion for corresponding PCT International Application No. PCT/US2019/035418, dated Aug. 16, 2019 by the International Searching Authority.

Aung, M. M. et al., Temperature management for the quality assurance of a perishable food supply chain, Food Control, 40 (2014) 198-207.

Do Nascimento Nunes, M. C. et al., Improvement in fresh fruit and vegetable logistics quality: berry logistics field studies, Phil. Trans. R. Soc. A, 372(2017), 20130307.

Hertog, M. L. A. T. M. et al., Predicting keeping quality of strawberries (cv. 'Elsanta') packed under modified atmospheres: an integrated model approach, Postharvest Biology and Technology, 15 (1999) 1-12.

Sciortino, R. et al., A webGIS-based system for real time shelf life prediction, Computers and Electronics in Agriculture, 127 (2016) 451-459.

Tsironi, T. et al., Shelf-life prediction models for ready-to-eat fresh cut salads: Testing in real cold chain, International Journal of Food Microbiology, 240 (2017) 131-140.

European Search Report and Written Opinion dated Jan. 13, 2022 for corresponding EP Application No. 19815695.2.

* cited by examiner

SYSTEM AND METHOD FOR ROBUST, MODULAR, PRODUCT SENSITIVE MONITORING AND ENCODING OF QUALITY AND SAFETY ALONG THE PERISHABLE SUPPLY CHAIN

CROSS-REFERENCE TO RELATED APPLICATIONS

This application claim priority to U.S. Provisional Patent Application No. 62/680,390 entitled, "A Robust, Modular, Product Sensitive Approach to Monitoring and Encoding Quality Along the Supply Chain", filed on Jun. 4, 2018 the entirety of which is incorporated herein by reference.

BACKGROUND OF THE INVENTION

In a temperature-dependent supply chain for perishable products, commonly referred to as the "cold chain", different transportation temperature ranges are acceptable for different product categories, such as meats and seafood, fruits and vegetables, and flowers. For example, fresh flowers, seafood, vegetables, and fruits typically travel at temperatures between 36 and 46 degrees. While some less-sensitive produce, such as asparagus, pineapples, and avocados, may only require protection from extreme temperature variations.

Numerous studies of perishable products have shown that the efficiency of the cold chain and its temperature management is often less than ideal. Temperature abuses above or below the optimal product-specific temperature range occur frequently, a situation that significantly increases food waste and endangers food safety.

In the U.S., it is estimated that approximately 12% of food waste occurs during distribution, mainly because of inappropriate refrigeration. Monitoring perishable products exposed to intermittent and temporary temperature abuses along the cold chain is critical. For instance, if the time-temperature history of food from harvesting or processing to storage at the distribution center is known, then shipping a perishable food that has been subjected to temperature abuses to a retailer located too far away can be avoided by estimating the food's remaining shelf-life.

While various perishable product quality prediction algorithms are known in the art, they are all based on predicting the shelf life of the perishable product. However, none of the prior art implementations include an embedding scheme which incorporates both product and transportation quality into a comprehensive metric.

Accordingly, what is needed in the art is a system and method for estimating the condition of a product upon arrival at a destination and for objectively quantifying and addressing the quality of temperature management and handling at various stages from harvest to destination.

SUMMARY OF THE INVENTION

As critical as it is to estimate the remaining shelf life of a product based upon its time-temperature history, it is also important to objectively quantify the quality of temperature management and handling at various stages in the cold chain, from initial harvest to destination. A perishable product's "shelf life" generally refers to the length of time one can expect a product to look and act as expected and to stay safe for use. Shelf-life is dependent upon a perishable product's time-temperature history and the remaining shelf-life of a perishable product upon arrival at a destination is the length of time remaining before the perishable product is no longer safe for use.

The embodiments of the present invention improve post-harvest monitoring and modeling of the perishable supply chain using sensors and analytics by providing a robust, modular and product sensitive encoding of food and transportation/handling quality.

In one embodiment, the present invention provides a computer-implemented method for determining a quality code for a perishable product. The method includes, obtaining an initial cooling time-temperature profile using one or more temperature sensors associated with a perishable product, wherein the initial cooling time-temperature profile tracks the temperature variation that the perishable product experiences between time of harvest and initial cooling and assigning an initial cooling score to the perishable product based upon the initial cooling time-temperature profile and a known effect of the initial cooling time-temperature profile on the perishable product. The method further includes, obtaining a transportation time-temperature profile from the one or more temperature sensors associated with the perishable product, wherein the transportation time-temperature profile tracks the temperature variation that the perishable product experiences during transportation of the product to a destination following the initial cooling of the perishable product and assigning a transportation temperature score to the perishable product based upon the transportation time-temperature profile and a known effect of the transportation time-temperature profile on the perishable product. The method also includes, predicting a remaining shelf-life of the perishable product at the destination, wherein the remaining shelf-life of the perishable product is based upon the initial cooling time-temperature profile, the transportation time-temperature profile and a known effect of the initial cooling time-temperature profile and the transportation time-temperature profile on the shelf-life of the perishable product, assigning a predicted remaining shelf-life score to the perishable product based upon the predicted remaining shelf-life of the perishable product and generating a quality code for the perishable product, the quality code comprising the initial cooling score of the perishable product, the transportation temperature score of the perishable product and the predicted remaining shelf-life of the perishable product.

The method may further include determining a remaining shelf-life of the perishable product at the destination and adjusting one or more of the initial cooling score and the transportation temperature score based upon the remaining shelf-life of the perishable product.

In a particular embodiment, the quality code for the perishable product may be generated using one or more deep learning tools and in a specific embodiment the quality code of the perishable product may be alphanumeric.

The present invention additionally provides a system for determining a quality code for a perishable product. The system includes one or more sensors for obtaining an initial cooling time-temperature profile using one or more temperature sensors associated with a perishable product, wherein the initial cooling time-temperature profile tracks the temperature variation that the perishable product experiences between time of harvest and initial cooling and for obtaining a transportation time-temperature profile from the one or more temperature sensors associated with the perishable product, wherein the transportation time-temperature profile tracks the temperature variation that the perishable product experiences during transportation of the product to a destination following the initial cooling of the perishable product. The system further includes processing hardware and software for assigning an initial cooling score to the perishable product based upon the initial cooling time-temperature profile and a known effect of the initial cooling time-temperature profile on the perishable product, for assigning a transportation temperature score to the perishable product based upon the transportation time-temperature profile and a known effect of the transportation time-temperature profile on the perishable product, for predicting a remaining shelf-life of the perishable product at the destination, wherein the remaining shelf-life of the perishable product is based upon the initial cooling time-temperature profile, the transportation time-temperature profile and a known effect of the initial cooling time-temperature profile and the transportation time-temperature profile on the shelf-life of the perishable product, for assigning a predicted remaining shelf-life score to the perishable product based upon the predicted remaining shelf-life of the perishable product and for generating a quality code for the perishable product, the quality code comprising the initial cooling score of the perishable product, the transportation temperature score of the perishable product and the predicted remaining shelf-life of the perishable product.

The invention further includes, one or more non-transitory computer-readable media having computer-executable instructions for performing a method of running a software program on a computing device for determining a quality code for a perishable product, the computing device operating under an operating system, the method including issuing instructions from the software program comprising, obtaining an initial cooling time-temperature profile using one or more temperature sensors associated with a perishable product, wherein the initial cooling time-temperature profile tracks the temperature variation that the perishable product experiences between time of harvest and initial cooling and assigning an initial cooling score to the perishable product based upon the initial cooling time-temperature profile and a known effect of the initial cooling time-temperature profile on the perishable product. The media further includes instructions for obtaining a transportation time-temperature profile from the one or more temperature sensors associated with the perishable product, wherein the transportation time-temperature profile tracks the temperature variation that the perishable product experiences during transportation of the product to a destination following the initial cooling of the perishable product and for assigning a transportation temperature score to the perishable product based upon the transportation time-temperature profile and a known effect of the transportation time-temperature profile on the perishable product. The media further includes instructions for predicting a remaining shelf-life of the perishable product at the destination, wherein the remaining shelf-life of the perishable product is based upon the initial cooling time-temperature profile, the transportation time-temperature profile and a known effect of the initial cooling time-temperature profile and the transportation time-temperature profile on the shelf-life of the perishable product, assigning a predicted remaining shelf-life score to the perishable product based upon the predicted remaining shelf-life of the perishable product and generating a quality code for the perishable product, the quality code comprising the initial cooling score of the perishable product, the transportation temperature score of the perishable product and the predicted remaining shelf-life of the perishable product.

The quality code for the perishable product provided by the system and method of the present invention may be used in various ways improve the cold supply chain. For example, when perishable products arrive at a destination, such as a warehouse, it is standard practice to perform a visual/sensory inspection of a random selection of the products for quality control purposes. Additionally, the temperature loggers used in the shipment are checked to ensure that the required temperature specifications for the particular product have been met during the transportation process. The temperature loggers may include alarms to indicate out of temperature conditions or alternatively the data from the temperature loggers may be downloaded and analyzed. By utilizing the quality code provided by the present invention, these standard practices can be supplemented or possibly replaced. By pre-calculating and displaying the quality code provided by the present invention, the quality control personnel can quickly assess the remaining shelf-life of the perishable product and the temperature conditions that the perishable product has been subjected to during transportation.

Additionally, the quality code of the present invention can be used to pinpoint the cause of any substandard quality experience during the transportation process. For example, it can be determined if the quality of the perishable product is unacceptable because there was a long time period before precooling or was it because of warmer than average temperatures inside the shipping trailer. While as expert analysis of the data provided by the temperature logger would normally be required to make such an assessment, with the quality code of the present invention, pinpointing the cause of issues in the supply chain are easily identified.

The use of the quality code of the present invention provide a more ubiquitous approach with no reduction in efficiency. Specifically, adding additional sensors/loggers to the shipping process does not result in an increased time to perform the quality control analysis of the perishable products because an automated predictive algorithm is used to generate the quality code.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the invention, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

Figure 1:
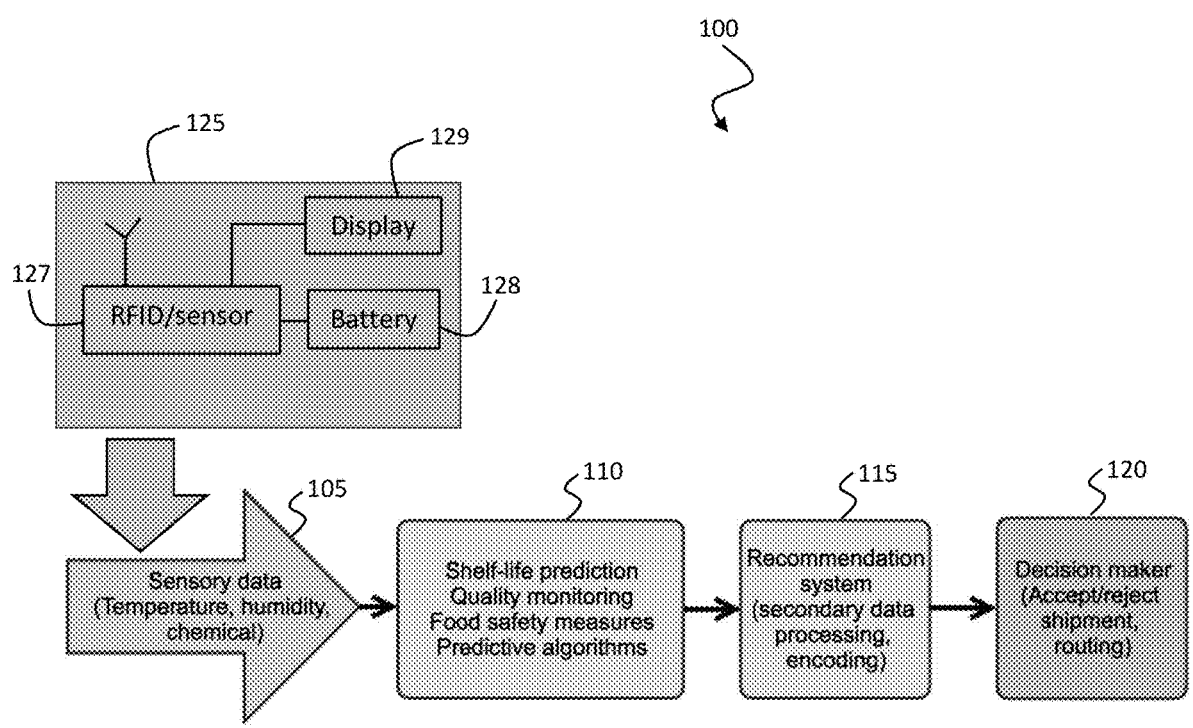
FIG. 1 illustrates the sensors and the flow of sensory data in accordance with an embodiment of the present invention.

With reference to FIG. 1, the system 100 of the present invention for assessing the temperature-dependent supply chain for a perishable product may include one or more sensors 125 for acquiring sensory data from the perishable product during the transportation of the perishable product through the supply chain. The sensor 125 may include a wireless RFID (Radio Frequency Identification) tag 127 that is capable of detecting environmental changes and events and communicate the data wirelessly to an RFID reader. Such telemetry products are ideal in situations where measurements need to be remotely and automatically captured. Depending on the sensor, the RFID tags could sense variances in motion, humidity, temperature, pressure, and more. The sensor 125 may further include a display 129 for displaying the quality code for the perishable product and a battery 128. Alternatively, the quality code may be stored to a cloud-based system for accesses by a user.

The sensory data 105 collected by the sensor 125 may then be used for predicting the shelf-life of the perishable product or for monitoring the quality of the perishable product using food safety measures and predictive algorithms 110. A recommendation system 115 may then use the predicted shelf-life and quality of the perishable product to perform secondary processing and encoding to generate a quality code for the perishable product. The quality code may then be provided to a decision maker 120 and the decision maker may use the quality code to determine whether to accept or reject the shipment and to decided upon subsequent routing for the perishable product.

Figure 2:
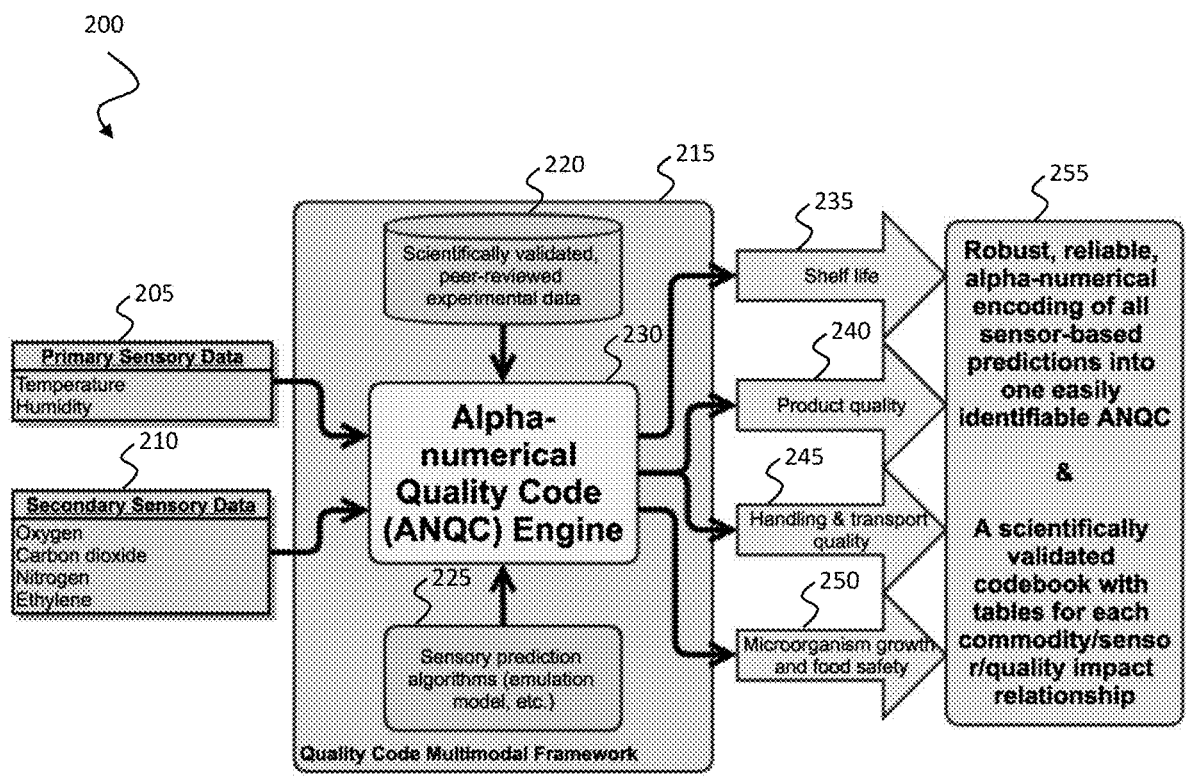
FIG. 2 is a block diagram illustrating the multi-model functional elements of the present invention for calculating a quality code for a perishable product, in accordance with an embodiment of the present invention.

FIG. 2 provides a block diagram 200 illustrating the system and method for monitoring the cold chain for a perishable product, in accordance with an embodiment of the present invention. As shown in FIG. 2, primary sensory data 205 and secondary sensory data 210 may be collected by various sensors associated with the perishable product. The primary sensory data 205 may include temperature and humidity conditions of the perishable product and the secondary sensory data 210 may include oxygen, carbon dioxide, nitrogen and ethylene levels associated with the perishable product during the cold chain. The firmness, color, humidity, oxygen, carbon dioxide, nitrogen and ethylene levels can be integrated into the model to provide a better estimation of product and transportation qualities. This list is not meant to be exhaustive and various other observable and scientifically determined characteristics of the perishable products are within the scope of the present invention.

The sensory data 205, 210 is then provided to a quality code multimodal framework 215 for further processing by a quality code engine 230. The quality code engine 230 receives the sensory data 205, 210 along with scientifically validated and/or peer-reviewed experimental data 220 and sensory prediction algorithms 225 to determine a quality code for the perishable product. The emulation algorithms, which can predict product temperatures from ambient temperatures and additional sensory inputs can be used to augment the quality code with new metrics such as microorganism growth probabilities for food safety. The quality code provides a means for assessing various conditions of the perishable product at the destination, including shelf-life 235, product quality 240, handling and transportation quality 245 and microorganism growth and food safety 250. As such, the present invention provides a robust, reliable, encoding of all the sensor-based predictions into one easily identifiable quality code allowing for the derivation of a scientifically validated codebook with tables for each commodity/sensor/quality impact relationship 255.

In one exemplary embodiment, the present invention provides a quality code which encodes three important performance metrics of the cold chain for a perishable product, such as produce. In this exemplary embodiment, the encoded metrics include, cut-to-cool time, transportation quality and accumulated shelf life loss, which is based upon the time-temperature profile logged during the time from harvest to arrival at the destination. In another embodiment, the encoded metrics of the quality code include, cut-to-cool time, transportation quality and the likely microorganism growth rates for the perishable product, which is based upon the time-temperature profile logged during the time from harvest to arrival at the destination.

The metrics of the quality code are encoded to provide a compact, modular and simple to read format. In a particular embodiment, the quality code is an alphanumeric code.

While one embodiment of quality code, as explained below, is developed specifically for strawberries, the parameters of the quality code model can easily be adjusted to other perishable products based on the specific needs of the end-user through a systematic and scientifically validated process.

It is known that strawberries are suitable as fresh-cut produce to have a shelf-life of about 7 days at 2.5° C. (37° F.) and 5 days at 5° C. (41° F.). Additionally, the respiration rates for strawberries are known wherein:

| Temperature | mg $CO_2$ $kg^{-1}$ $h^{-1}$ |
|---|---|
| 0° C. | 12 to 20 |
| 10° C. | 50 to 100 |
| 20° C. | 100 to 200 |

In one embodiment, the quality code is an alphanumeric code that predicts the quality of the perishable product at the destination and is referred to as the alphanumeric quality code (ANQC). In this embodiment, the ANQC consists of three algorithms which automatically calculate the three-metrics outlined above (cut-to-cool time, transportation quality and remaining shelf life) from a time-temperature vector generated and stored by any temperature logger (sensor). Each portion of the model has been validated on real temperature profiles from harvest to storage. In particular, the ANQC consists of three indicators, where two letters and a number encode the product and handling quality. The first two letters in the ANQC indicate the quality of precooling and transportation, respectively, and the number indicates the relative amount of shelf life remaining at the instant of calculation, as shown in the table below.

The uniqueness of the proposed ANQC is the way it automatically calculates and combines multiple indicators of product quality in one easily understandable format. In addition to this, every single model parameter can be fine-tuned to different products, or even different species of the same product as well as unique customer needs/expecta-

TABLE I

Explanation of alpha-numerical encoding in ANQC.

| Handling quality with cut-to-cool time (CTC) | | Transportation quality with time above ideal temperature (TAIT) | | Accumulated shelf-life loss (SL) | |
|---|---|---|---|---|---|
| A | Calculated CTC is less than the ideal CTC as specified for the product. | A | TAIT is less than the optimal TAIT percentage. | 1 | Remaining ST is greater than 90% of max SL |
| B | CTC is longer than the ideal CTC but less than the unacceptable CTC specified for the product. | B | TAIT is between the optimal and unacceptable TAIT percentages. | 2 | Remaining SL is between 50-90% of max SL. |
| C | CTC is longer than the unacceptable CTC specified for this product. | C | TAIT is more than the unacceptable TAIT percentage. | 3 | Remaining SL is less than 50% of max SL. |

Table I summarizes how the ANQC is constructed. The precooling quality can be measured as "A", "B" or "C" where "A" stands for a cut-to-cool time of less than the optimal cut-to-cool time, which can be specified for a particular product or customer. "B" stands for longer than optimal but still less than the unacceptable cut-to-cool time, which can separately be set as another performance indicator. Finally, "C" stands for a longer delay in precooling than the unacceptable cut-to-cool time. Note that the first module of the ANQC algorithm can automatically identify the cut-to-cool time given any time-temperature vector for any perishable product.

The transportation quality is measured as the percentage of time the product spent above its ideal temperature—otherwise known as time-above-ideal-temperature or TAIT. "A" stands for a lesser percentage than the optimal percentage TAIT, "C" stands for a higher percentage than the unacceptable percentage TAIT and "B" stands for anything in between. Each of these performance parameters are adjustable based on the product and the particular needs of the customer. Note that the second module ANQC algorithm can automatically calculate TAIT given any time-temperature vector for any perishable product.

Finally, the shelf life quality is measured as the remaining days in shelf life, estimated through an efficient exponential interpolation model of respiration rate vs. temperature derived from scientifically validated data included in the USDA's Agriculture Handbook 66. "1" stands for a remaining shelf life greater than 90% of the product's maximum shelf life (another adjustable parameter by the customer). "3" stands for remaining shelf life less than 50% of the product's maximum shelf life and "2" stands for anything in between. Note that the third and final module of the ANQC algorithm can automatically calculate the remaining shelf life on any perishable product after proper fitting on scientifically validated respiration rate vs. temperature data such as those included in the USDA's Agriculture Handbook 66.

tions/definitions on what a high-quality product really means. The model has been validated on real temperature profiles along the cold chain.

Figure 3:
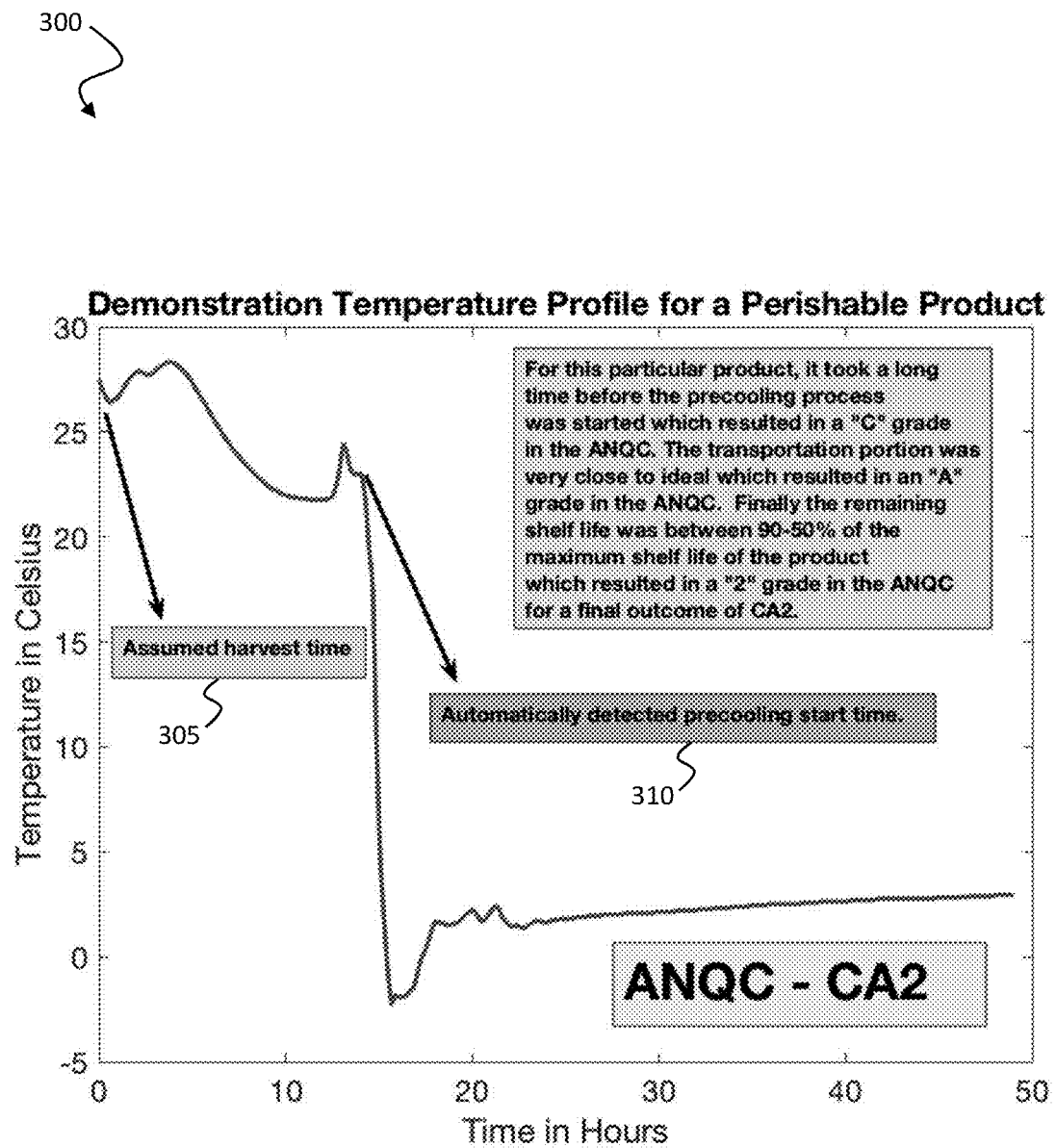
FIG. 3 is a diagram illustrating a time-temperature profile for strawberries during a first transportation scenario, in accordance with an embodiment of the present invention.
Figure 4:
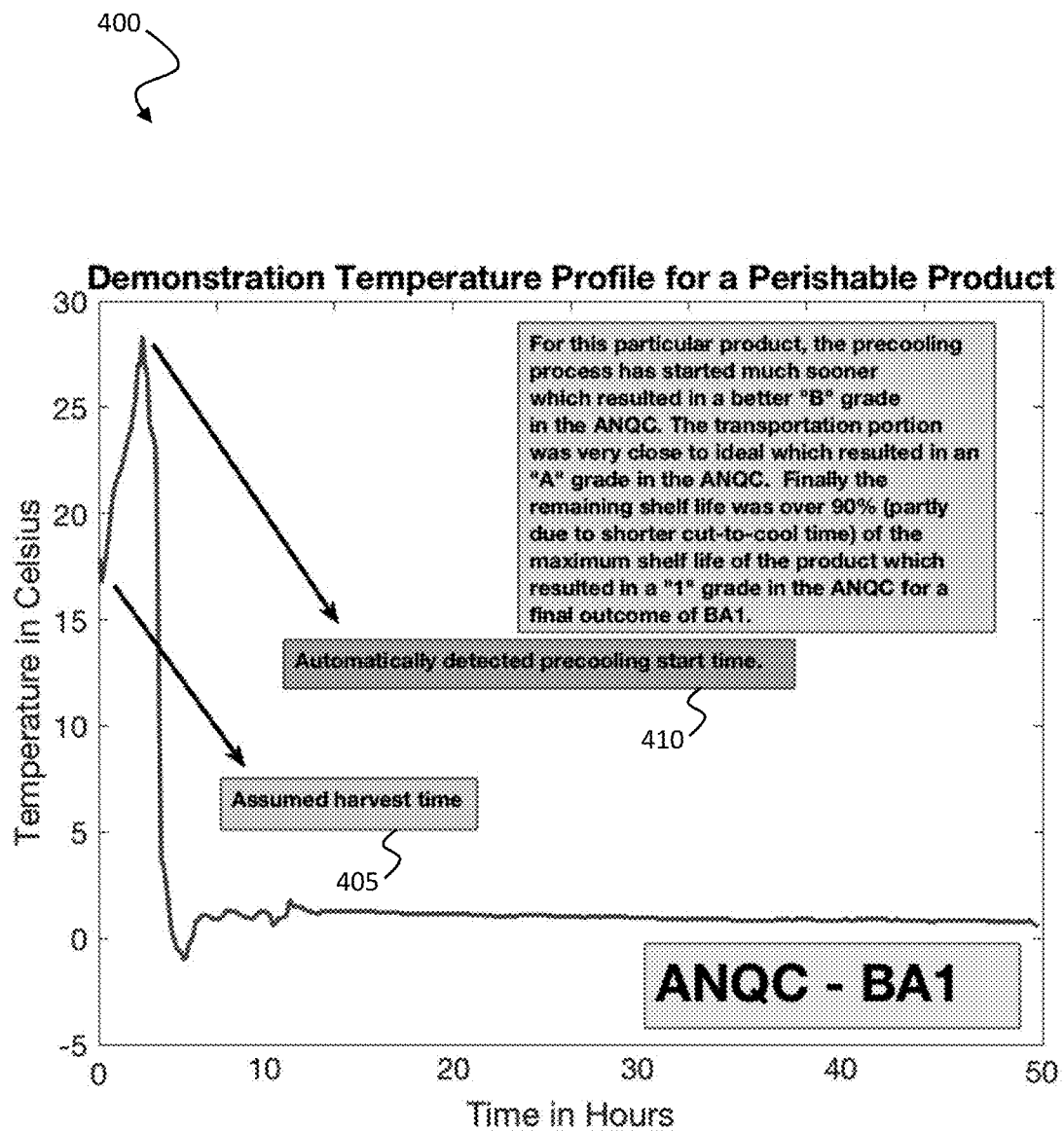
FIG. 4 is a diagram illustrating a time-temperature profile for strawberries during a second transportation scenario, in accordance with an embodiment of the present invention.

FIG. 3 and FIG. 4 demonstrate how the ANQC encodes two uniquely different temperature profiles for two different transportation scenarios. In FIG. 3, the time-temperature profile 300 shows that the automatically calculated time between assumed harvest time 305 and precooling 310 is approximately 15 hours, which represents an undesirable scenario for a highly perishable product, like strawberries. As a result, the first letter grade of the ANQC is a "C" representing the precooling handling quality. Once the products are precooled, the transportation portion is executed properly where the products remain below the specified ideal temperature for the majority of the trip generating an "A" code for the transportation section. Finally, the calculated predicated remaining shelf life is between 50%-90% of the maximum shelf life of the product which is indicated by the "2" grade as the final indicator of the ANQC.

Comparatively, the time-temperature profile 400 in FIG. 4, represents a more ideal scenario, where the products are cooled 410 within 4 hours of the assumed harvest time 405, which is represented by a "B" grade in precooling handling quality. The transportation is then executed properly as in time-temperature profile 300, however, due to a significantly shorter cut-to-cool window, the calculated predicted remaining shelf-life is greater than 90% of the maximum shelf life of the product resulting in a better "1" grade as the final indicator of ANQC.

The proposed method represents a paradigm shift in the way temperature and quality monitoring is performed in the supply chain. While many competing algorithms exist both in the literature and on the market to predict perishable shelf lives based on time-temperature data, a complete and modular assessment of the entire cold chain process has never been expressed in such a compact format based on scientific validation. Another advantage of ANQC is the ability to fine tune the model parameters for different products as well as different needs and expectations of customers. Finally, the modular assessment of the cold chain also enables the end-users of this technology, from growers to shippers to retailers, to properly claim responsibility and identify parts of their cold chain which require adjustments to achieve optimal efficiency and performance.

Figure 5:
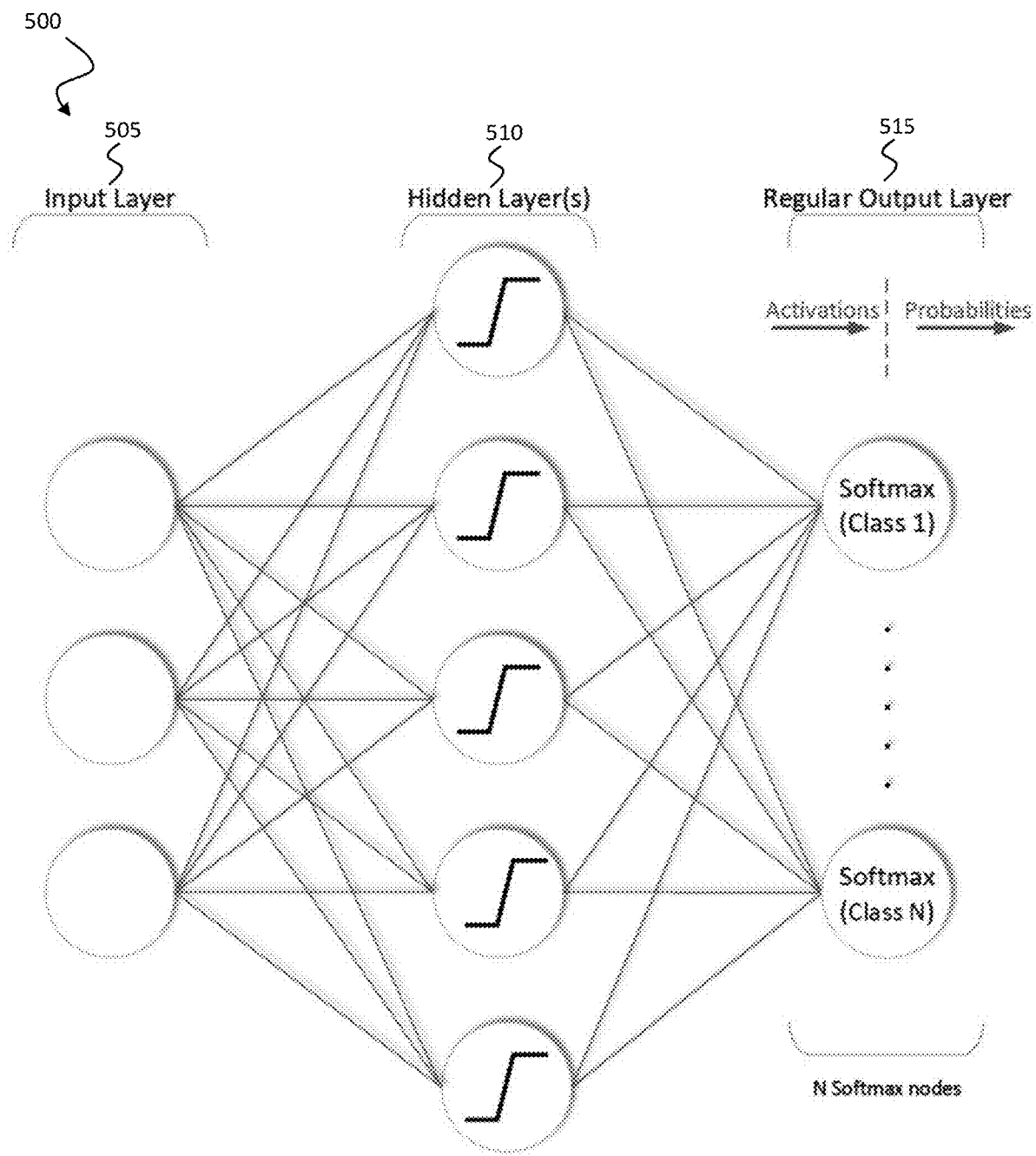
FIG. 5 is an illustration of a generic artificial neural network (NN) topology used in machine learning, in accordance with an embodiment of the present invention.

In a particular embodiment, Artificial Intelligence (AI) and a Machine (Deep) Learning Driven approach is used for the quality code (ANQC) generation in the supply chain There have been recent fundamental breakthroughs in the area of machine learning thanks to the availability of massive amounts of data collected through a variety of medium such as social media and prevalent Internet-of-Things applications and capable hardware and software tools which can perform analytics on this data and create predictions at the same level or better than human performance. As the alpha-numerical-quality-code (ANQC) is developed, it is important to include generic algorithms, such as artificial neural networks (NN) 500, as shown in FIG. 5, which can act as multi-model predictors to process different sensory data in generating a singular ANQC. As is known in the art, an artificial neural network 500 may include various input layers 505 and hidden layers 510 to provide output layers 515 providing calculated probabilities based upon the sensory data provided to the input layers 505.

Figure 6:
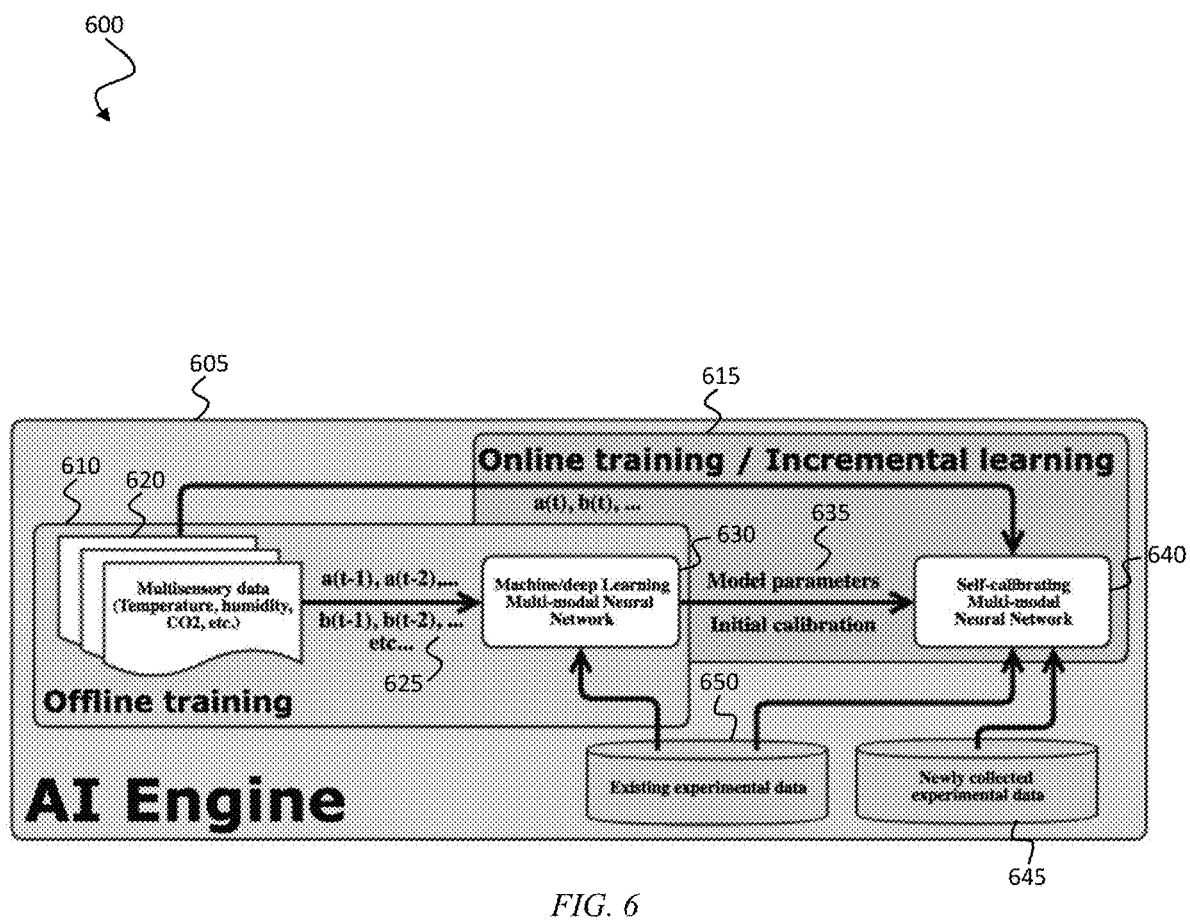
FIG. 6 is an illustration of an AI engine which enables self-calibration and learning using multi-modal neural networks, in accordance with an embodiment of the present invention.

In the contest of the present invention, as shown in FIG. 6, an additional embodiment of the present invention may include the capability of online/incremental learning as more data becomes available throughout the use of the process. Specifically, a system 600 for calculating a quality code for a perishable product may include an AI engine 605 including an offline training component 610 and an online training component 615. The offline training component 610 includes historical multi-sensory data 625 and experimental data 650 that can be used to initially train a NN 630 in generating a specific quality code for a perishable product. The parameters 635 of the trained model can then be passed through to the operational online NN 615 which has the capability to self-calibrate 640 its parameters based on newly available sensory data 620 and experimental data specific 645 for both that product as well as that particular supply chain. This process is called online or incremental learning and has the capability to generate more accurate product quality predictions, as time goes on.

Fundamentally, the quality code of the present invention is based upon domain-specific models. Within this context, "domain-specific" refers to a model which is based upon the physical and/or biological properties of the process being modeled.

For example, in one embodiment, the shelf-life component of the quality code model for perishable produce, such as strawberries, is based upon the biological correlations between three separate quantities, including the environmental factor (such as temperature, humidity, etc.), the respiration rate of the perishable fruit for which the model is designed and the expiration of the shelf life of the perishable fruit based upon the temperature specific respiration rate.

Alternatively, in another embodiment, the quality code may include a most probably number range (MPN) component to provide a safety code model that utilizes the growth rate of microorganisms that are previously calculated for different temperatures in an interpolating algorithm for computing the quality code of the perishable produce.

Similarly, the pre-cooling component of the quality code may utilize a double-time-derivative function to identify the point in time with the largest temperature differential, which indicates the start of the pre-cooling process (another domain-specific information), as illustrated in the time-temperature profiles of FIG. 3 and FIG. 4.

Finally, the transportation component of both the quality and the safety models uses a thresholding function to identify the relative ratio of time which is spent above an ideal keeping temperature of the perishable product which is know to have an adverse effect of the quality or safety of the product when it is too high. Given a certain sensory profile (such as the time-temperature historical data) the model uses such domain-specific knowledge to ultimately produce an output, referred to as the quality code, which encodes the quality and the safety of the product, it's handling and/or transportation in an easy-to-understand alphanumeric code.

While the approach described above is based upon scientifically validated knowledge, the model is unable to handle a crucial component of a successful industry-scale implementation, which includes user feedback. In other words, once the model is developed for a certain commodity and handling/transportation scenario, the model will always output a deterministic quality and safety code based upon its input sensory data. When the output of the model does not match with the actual on-the-spot observations of quality or safety checks at various points in the supply chain for possible validation of the model, there is no natural way to incrementally update the model, on-demand, to account for discrepancies. Additionally, while the model can output scientifically accurate results of a given sensory profile, its output may not match with consumer expectations or the consumer's "perceived quality" of the product. The model system and method previously described has not built-in natural capability to process such correlations (i.e. actual quality vs. perceived quality) or to provide data-drive feedback to the consumer for possible reasons explaining their observations.

In order to provide data-drive feedback to improve the previously described model, in an additional embodiment an AI tool is integrated into the system which models the input-output relationship in a non-domain specific and non-linear fashion for both the quality and safety components of the proposed model. This approach has the capability to accept incremental feedback to consistently improve the performance of the model while in operation based on either observed of perceived quality/safety of the perishable product. Recent years have seen ground-breaking advances in a specific area of artificial intelligence (AI) called the "Deep Learning" which uses advanced non-linear generic algorithms to learn, and in many instances outperform, domain-specific tasks such as image classification and speech recognition. However, a significant challenge in training and using such models is the need for high volumes of well-structured data (i.e., big data) for robust real-life application performance. While this problem has been addressed rather successfully in a variety of applications where large amounts of data are readily available (such as image classification) thanks to the advance of the Internet and cloud storage, other areas where the data is either lacking or difficult to access (such as food transportation as discussed in this patent application) still represent a major challenge.

Accordingly, additional novel approaches are proposed to solve this problem and make the quality code models for different perishable products both more robust and customizable to the needs and specifications of both the users of this technology (such as growers, shippers, retailers) and the consumers of perishable products.

The present invention proposes a pathway between the expert observed/tested characteristics of the perishable product, such as shelf life, microorganism growth, handling, etc., and the deep learning quality code model to improve prediction accuracy over time. The present invention also proposes pathway between the consumer observed sensory characteristics of the commodity, such as taste, smell, color, firmness, etc., and the deep learning quality code model to learn the underlying causality between the handling and transportation of the product and the consumer observed characteristics. For example, if a consumer rates a product as sour, this could mean that the Brix level was low, or that the product was not harvested at peak maturity, or the presence of spoilage microorganisms. These factors may all be encoded by the quality code model to provide effective feedback. The present invention additionally provides the capability to learn the correlation between the quality and the safety models for those perishable products where both models are in-use. For example, can a lower product quality automatically indicate a higher probability of contamination?

Figure 7:
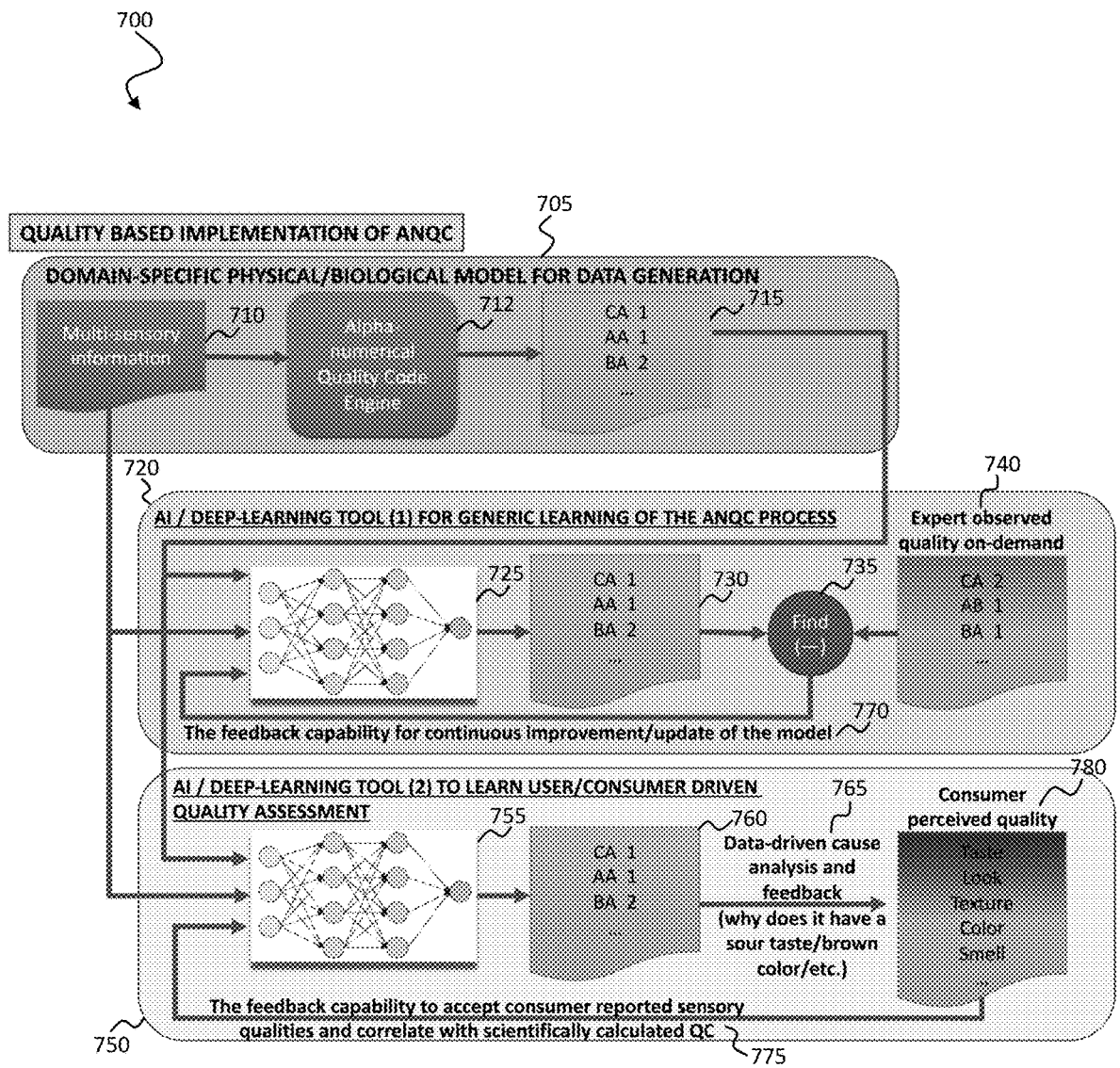
FIG. 7 is a detailed flowchart of a model for calculating a quality code related to the quality of a perishable product using two individual deep-learning techniques, in accordance with an embodiment of the present invention.
Figure 8:
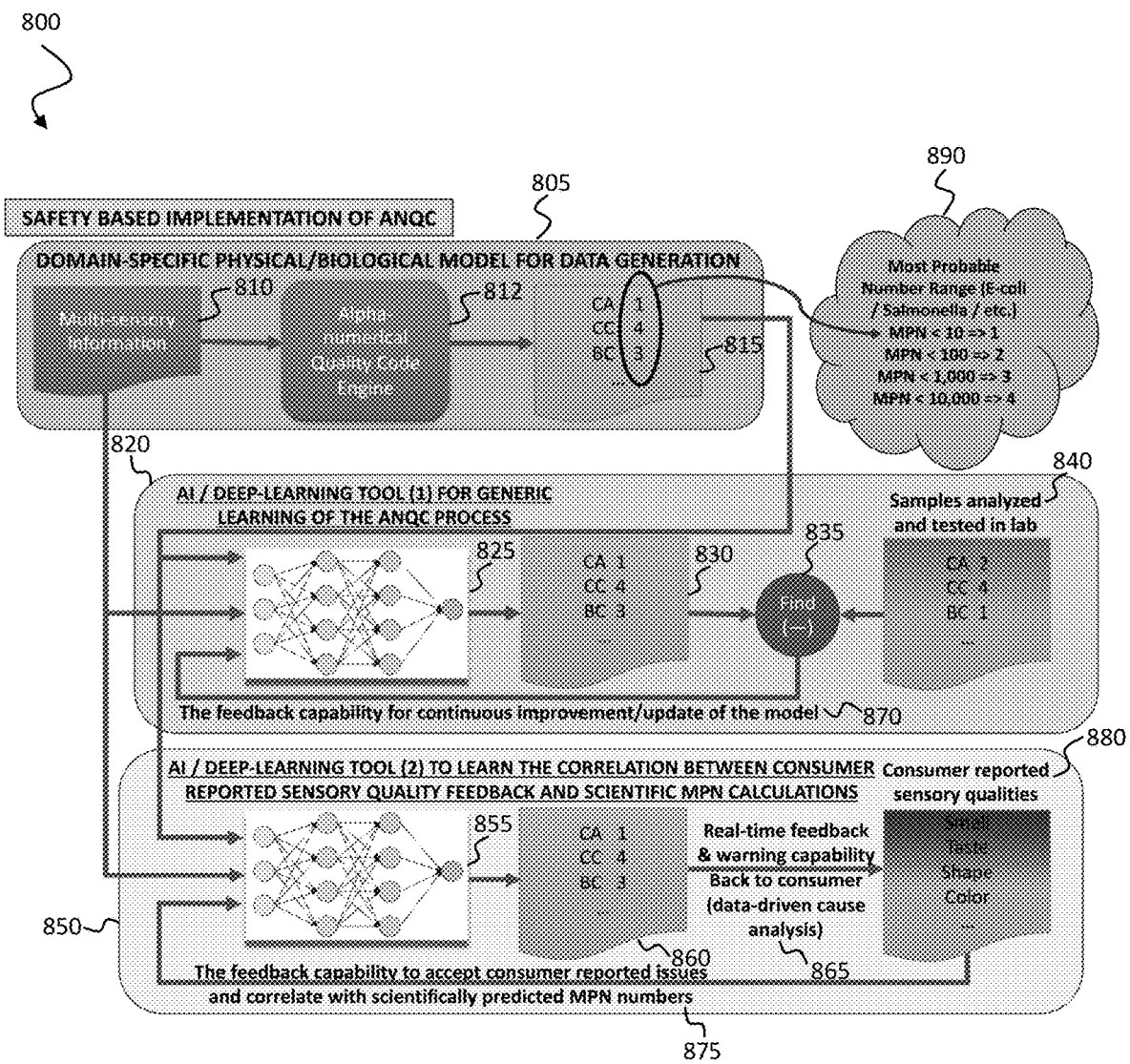
FIG. 8 is a detailed flowchart of a model for calculating a quality code related to the safety of a perishable product using two individual deep-learning techniques, in accordance with an embodiment of the present invention.

The proposed approach is demonstrated in a flow-chart for quality shown FIG. 7 and in a flow-chart for safety in FIG. 8. The purpose here is to provide an example for two different commodities such as a perishable fruit and a meat product to highlight the modularity of the quality code model where different components of it can be used for different commodities.

With reference to FIG. 7, a flow-chart 700 illustrating the inventive method for perishable fruit includes a domain-specific physical/biological model for data generation 705, a first AI/Deep-Learning tool 720 for generic learning of the quality code process and a second AI/Deep-Learning tool 750 to learn user/consumer driven quality assessment.

As previously described regarding the domain-specific physical/biological model for data generation 705, multi-sensory information 710 is provided to a quality code engine 712 to calculate the quality code 715 for the perishable product. As such, domain-specific information, such as respiration rate vs. temperature correlations, microorganism growth rates at different temperatures and industry standard processing and shipping requirements for a specific commodity are used to build the physical/biological quality code model. The quality code model is used to generate a sufficient amount of data to be used in the training of a generic deep learning model, such as a deep feed-forward neural network, to establish two AI tools.

A first AI tool 720 is trained using the data generated by the domain-specific physical/biological model 705 to predict the quality code output 730 for a given environmental sensory input with the highest scientific accuracy using standard deep neural network training approaches 725 such as error back-propagation and stochastic gradient-descent. Once trained, the first AI tool 720 can be used as a robust replacement for the original domain-specific quality code model 705 with the added capability of error feedback, as described below.

During operation, the first AI tool 720 can update its parameters with on-demand re-training of the model using the difference vectors 735 between the output of the model and expert observed quality on-demand 740, such as warehouse quality controls and inspections, as a feedback loop 770. The use of feedback allows the first AI tool 720 to continuously improve its predictive performance while in operation.

A second AI tool 750 is similarly trained to first predict the quality code output 760 with the highest scientific accuracy using the artificial neural network 755. However, unlike the first AI tool 720, the second AI tool 750 will continue to update its parameters with the "perceived" quality of the commodity 780 as feedback 775 either by the consumers or the requirements/specifications of the supply chain stakeholder, such as the retailer. This ultimately allows the model to learn the correlations between the actual and perceived qualities of the commodity and continually improve its customizability to the needs and specifications of the users of this technology or the consumers of the commodity. For example, in the case of the quality code, it can learn to correlate user observed sensory characteristics such as taste, smell, color with the calculated quality code.

The second AI tool 750 also has the capability to provide feedback to the consumer in the form of data-driven cause analysis 765 to identify reasons for certain product qualities, such as sour taste, brown color, etc.

With reference to FIG. 8, a flow-chart 800 illustrating the inventive method for perishable meat includes a domain-specific physical/biological model for data generation 805, a first AI/Deep-Learning tool 820 for generic learning of the quality code process and a second AI/Deep-Learning tool 850 to learn user/consumer driven quality assessment.

As previously described regarding the domain-specific physical/biological model for data generation 805, multi-sensory information 810 is provided to an quality code engine 812 to calculate the quality code 815 for the perishable product. As such, domain-specific information, such as microorganism growth rates at different temperatures and industry standard processing and shipping requirements for a specific commodity are used to build the physical/biological quality code model. The quality code model is used to generate a sufficient amount of data to be used in the training of a generic deep learning model, such as a deep feed-forward neural network, to establish two AI tools.

A first AI tool 820 is trained using the data generated by the domain-specific physical/biological model 805 to predict the quality code output 830 for a given environmental sensory input with the highest scientific accuracy using standard deep neural network training approaches 825 such as error back-propagation and stochastic gradient-descent. Once trained, the first AI tool 820 can be used as a robust replacement for the original domain-specific quality code model 805 with the added capability of error feedback, as described below.

During operation, the first AI tool 820 can update its parameters with on-demand re-training of the model using the difference vectors 835 between the output of the model and expert observed quality on-demand 840, such as warehouse quality controls and inspections, as a feedback loop 870. In the case of food safety, the lab results of sample analysis to determine microorganism growth can be used as the feedback. The presence of harmful microorganisms can be detected scientifically with screening tools, assay kits, camera systems and other technology, and the results can be fed back into the model. The use of feedback allows the first AI tool 820 to continuously improve its predictive performance while in operation.

A second AI tool 850 is similarly trained to first predict the quality code output 860 with the highest scientific accuracy using the artificial neural network 855. However, unlike the first AI tool 820, the second AI tool 850 will continue to update its parameters with the "perceived" quality of the commodity 880 as feedback 875 either by the consumers or the requirements/specifications of the supply chain stakeholder, such as the retailer. This ultimately allows the model to learn the correlations between the actual and perceived qualities of the commodity and continually improve its customizability to the needs and specifications of the users of this technology or the consumers of the commodity. For example, in the case of the quality code representing safety, it can learn to correlate the same characteristics with the scientifically predicted most probable number (MPN) ranges for any possible microorganism growth.

The second AI tool 850 also has the capability to provide feedback to the consumer in the form of data-drive cause analysis 865 to identify reasons behind a potential food safety warning and the ability to provide such a warning in real-time.

A natural extension of is the capability to provide data-driven cause analysis feedback back to the consumer which will only improve over time. For instance, when the user reports a product with sour taste, or takes a picture of a bruised strawberry, the model will learn the underlying causality between its quality code and consumer observed characteristics.

In an additional embodiment, the output from the quality module of FIG. 7 and the output from the safety module of FIG. 8 can be combined to provide a modular quality code for the perishable product. In one embodiment, the quality module and the safety module can run in parallel and their outputs can be combined for an overall assessment of the perishable product. This modular approach will be effective in assessing the overall quality of a perishable product that includes parameters related to both safety aspects of the perishable product and quality aspects. For example, in the case of leafy greens, where *E. coli* outbreaks have caused tremendous impact on the industry in terms of safety, the quality is also important for sales and consumer satisfaction. In this instance, a modular quality code combining both quality and safety aspects is provided by the present invention, as illustrated in FIG. 9 and FIG. 10.

Figure 9:
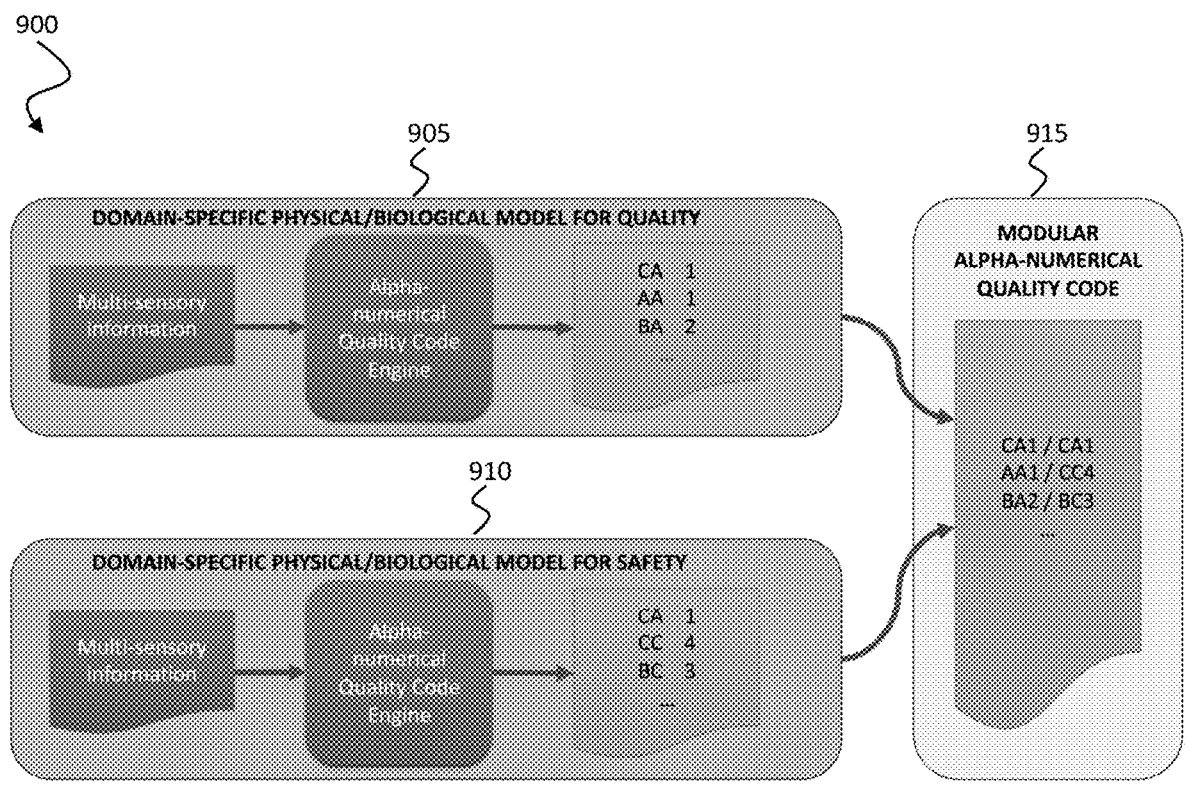
FIG. 9 is a detailed flowchart of a model for calculating a combined quality code and safety code for a perishable product using domain-specific physical/biological models, in accordance with the present invention.

As shown in FIG. 9, a model 900 for calculating a combined quality code and safety code for a perishable product using domain-specific physical/biological models includes both a domain-specific physical/biological model 905 for the quality assessment of the perishable product and a domain-specific physical/biological model 910 for the safety assessment of the perishable product. The outcome of the models 905, 910 are provided as a combined modular alphanumeric quality code 915 for the perishable product.

Figure 10:
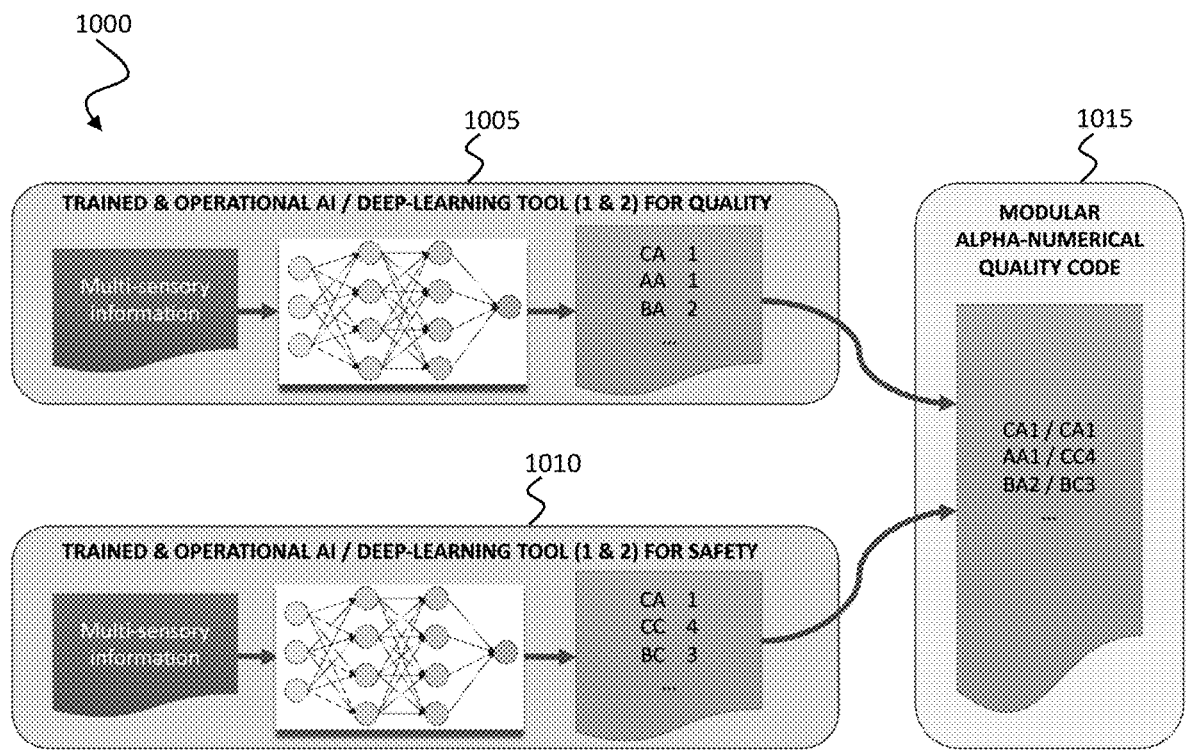
FIG. 10 is a detailed flowchart of a model for calculating a combined quality code and safety code for a perishable product using trained and operational AI/Deep Learning tools, in accordance with an embodiment of the present invention.

As shown in FIG. 10, a model 100 for calculating a combined quality code and safety code for a perishable product using trained and operational AI/Deep Learning tools includes both a trained and operational AI/Deep Learning tool 1005 for the quality assessment of the perishable product and a trained and operational AI/Deep Learning tool 1010 for the safety assessment of the perishable product. The outcome of the models 1005, 1010 are provided as a combined modular alphanumeric quality code 1015 for the perishable product.

It is important to note that neither of the AI tools can be developed without the underlying physical and biological fundamentals represented by the domain-specific quality code model in the first place.

The present invention, including the domain-specific physical/biological model to calculate a quality code, a first AI tool and a second AI tool, may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed:

1. A computer-implemented method for determining a quality code for a perishable product, the method comprising:
    receiving, by a quality code engine, an initial cooling time-temperature profile from one or more temperature sensors associated with a perishable product, wherein the initial cooling time-temperature profile tracks the temperature variation that the perishable product experiences between a time of harvest of the perishable product and an initial cooling time of the perishable product, wherein the quality code engine comprises a trained neural network having a plurality of parameters;
    receiving, by the quality code engine, a known effect of the initial cooling time-temperature profile on the perishable product;
    identifying the initial cooling time of the perishable product using a double-time-derivative function to find a point in time in the initial cooling time-temperature profile having a largest temperature differential;
    determining a cut-to-cool time for the perishable product, wherein the cut-to-cool time is a difference between the time of harvest of the perishable product and the initial cooling time of the perishable product;
    assigning, by the quality code engine, an initial cooling score to the perishable product based upon the cut-to-cool time and the known effect of the initial cooling time-temperature profile on the perishable product;
    receiving, by the quality code engine, a transportation time-temperature profile from the one or more temperature sensors associated with the perishable product, wherein the transportation time-temperature profile tracks the temperature variation that the perishable product experiences during transportation of the product to a destination following the initial cooling of the perishable product;
    receiving, by the quality code engine, a known effect of the transportation time-temperature profile on the perishable product;
    assigning, by the quality code engine, a transportation temperature score to the perishable product based upon the transportation time-temperature profile and the known effect of the transportation time-temperature profile on the perishable product;
    predicting, by the quality code engine, a remaining shelf-life of the perishable product at the destination, wherein the remaining shelf-life of the perishable product is based upon the cut-to-cool time, the transportation time-temperature profile and the known effect of the initial cooling time-temperature profile and the transportation time-temperature profile on the shelf-life of the perishable product;
    assigning, by the quality code engine, a predicted remaining shelf-life score to the perishable product based upon the predicted remaining shelf-life of the perishable product;
    generating, by the quality code engine, a quality code for the perishable product, the quality code comprising the initial cooling score of the perishable product, the transportation temperature score of the perishable product and the predicted remaining shelf-life score of the perishable product;
    determining one or more difference vectors between the quality code generated by the quality code engine and one or more observed qualities of the perishable product at the destination;
    providing the one or more difference vectors as feedback to the quality code engine;
    adjusting one or more of the plurality of parameters of the quality code engine based upon the feedback; and
    displaying the quality code of the perishable product on a user display.

2. The method of claim 1, further comprising;
    determining a remaining shelf-life of the perishable product at the destination; and
    adjusting one or more of the initial cooling score and the transportation temperature score based upon the remaining shelf-life of the perishable product.

3. The method of claim 2, wherein determining a remaining shelf-life of the perishable product at the destination further comprises using expert observations of one or more quality features of the perishable product performed at the destination.

4. The method of claim 2, wherein determining a remaining shelf-life of the perishable product at the destination further comprises using consumer observations of one or more quality features of the perishable product performed at the destination.

5. The method of claim 2, wherein determining a remaining shelf-life of the perishable product at the destination further comprises using lab testing results of one or more quality features of the perishable product performed at the destination.

6. The method of claim 1, wherein the one or more observed qualities of the perishable product at the destination are selected from one or more observed sensory characteristics of the perishable product.

7. The method of claim 6, wherein the one or more observed sensory characteristics of the perishable product are selected from taste, smell, color, firmness of the perishable product.

8. The method of claim 1, wherein the one or more observed qualities of the perishable product at the destination are selected from and one or more measured characteristics of the perishable product.

9. The method of claim 1, wherein the quality code of the perishable product is selected from an alphanumeric quality code and an alphanumeric safety code.

10. The method of claim 1, wherein the known effect of the initial cooling time-temperature profile on the perishable product and the known effect of the transportation time-temperature profile on the perishable product is a respiration rate of the perishable product vs. temperature.

11. The method of claim 1, wherein the known effect of the initial cooling time-temperature profile on the perishable product and the known effect of the transportation time-temperature profile on the perishable product is a microorganism growth rate of the perishable product vs. temperature.

12. The method of claim 1, further comprising:
measuring one or more of, firmness, color, humidity, oxygen, carbon dioxide, nitrogen, ethylene, pH and Brix levels using one or more appropriate sensors; and
incorporating one or more of the measured firmness, color, humidity, oxygen, carbon dioxide, nitrogen ethylene, pH and Brix levels into the quality code for the perishable product.

13. A system for determining a quality code for a perishable product, the system comprising:
one or more sensors for;
obtaining an initial cooling time-temperature profile using associated with a perishable product from the one or more sensors, wherein the initial cooling time-temperature profile tracks the temperature variation that the perishable product experiences between a time of harvest of the perishable product and an initial cooling of the perishable product;
obtaining a transportation time-temperature profile from the one or more sensors, wherein the transportation time-temperature profile tracks the temperature variation that the perishable product experiences during transportation of the product to a destination following the initial cooling of the perishable product;
a quality code engine comprising a neural network having a plurality of parameters implemented in processing hardware and software for:
identifying the initial cooling time of the perishable product using a double-time-derivative function to find a point in time in the initial cooling time-temperature profile having a largest temperature differential;
determining a cut-to-cool time for the perishable product, wherein the cut-to-cool time is a difference between the time of harvest of the perishable product and the initial cooling time of the perishable product;
assigning an initial cooling score to the perishable product based upon the cut-to-cool time and the known effect of the initial cooling time-temperature profile on the perishable product;
assigning a transportation temperature score to the perishable product based upon the transportation time-temperature profile and a known effect of the transportation time-temperature profile on the perishable product;
predicting a remaining shelf-life of the perishable product at the destination, wherein the remaining shelf-life of the perishable product is based upon the cut-to-cool time, the transportation time-temperature profile and a known effect of the initial cooling time-temperature profile and the transportation time-temperature profile on the shelf-life of the perishable product;
assigning a predicted remaining shelf-life score to the perishable product based upon the predicted remaining shelf-life of the perishable product;
generating a quality code for the perishable product, the quality code comprising the initial cooling score of the perishable product, the transportation temperature score of the perishable product and the predicted remaining shelf-life of the perishable product;
determining one or more difference vectors between the quality code generated by the quality code engine and one or more observed qualities of the perishable product at the destination;
providing the one or more difference vectors as feedback to the quality code engine;
adjusting one or more of the plurality of parameters of the quality code engine based upon the feedback; and
a user display for displaying the quality code of the perishable product generated by the quality code engine.

14. The system of claim 13, where the processing hardware and software of the quality code engine is further for;
determining a remaining shelf-life of the perishable product at the destination; and
adjusting one or more of the initial cooling score and the transportation temperature score based upon the remaining shelf-life of the perishable product.

15. The system of claim 14, wherein determining a remaining shelf-life of the perishable product at the destination further comprises using expert observations of one or more quality features of the perishable product performed at the destination.

16. The system of claim 14, wherein determining a remaining shelf-life of the perishable product at the destination further comprises using consumer observations of one or more quality features of the perishable product performed at the destination.

17. The system of claim 14, wherein determining a remaining shelf-life of the perishable product at the destination further comprises using lab testing results of one or more quality features of the perishable product performed at the destination.

18. The system of claim 13, wherein the one or more sensors are for:
measuring one or more of, firmness, color, humidity, oxygen, carbon dioxide, nitrogen, ethylene, pH and Brix levels using one or more appropriate sensors; and
incorporating one or more of the measured firmness, color, humidity, oxygen, carbon dioxide, nitrogen, ethylene, pH and Brix levels into the quality code for the perishable product.

19. One or more non-transitory computer-readable media having computer-executable instructions for performing a method of running a software program on a computing device for determining a quality code for a perishable product, the computing device operating under an operating system, the method including issuing instructions from the software program comprising:

receiving, by a quality code engine, an initial cooling time-temperature profile from one or more temperature sensors associated with a perishable product, wherein the initial cooling time-temperature profile tracks the temperature variation that the perishable product experiences between a time of harvest of the perishable product and an initial cooling time of the perishable product, wherein the quality code engine comprises a trained neural network having a plurality of parameters;

receiving, by the quality code engine, a known effect of the initial cooling time-temperature profile on the perishable product;

identifying the initial cooling time of the perishable product using a double-time-derivative function to find a point in time in the initial cooling time-temperature profile having a largest temperature differential;

determining a cut-to-cool time for the perishable product, wherein the cut-to-cool time is a difference between the time of harvest of the perishable product and the initial cooling time of the perishable product;

assigning, by the quality code engine, an initial cooling score to the perishable product based upon the cut-to-cool time and the known effect of the initial cooling time-temperature profile on the perishable product;

receiving, by the quality code engine, a transportation time-temperature profile from the one or more temperature sensors associated with the perishable product, wherein the transportation time-temperature profile tracks the temperature variation that the perishable product experiences during transportation of the product to a destination following the initial cooling of the perishable product;

receiving, by the quality code engine, a known effect of the transportation time-temperature profile on the perishable product;

assigning, by the quality code engine, a transportation temperature score to the perishable product based upon the transportation time-temperature profile and the known effect of the transportation time-temperature profile on the perishable product;

predicting, by the quality code engine, a remaining shelf-life of the perishable product at the destination, wherein the remaining shelf-life of the perishable product is based upon the cut-to-cool time, the transportation time-temperature profile and the known effect of the initial cooling time-temperature profile and the transportation time-temperature profile on the shelf-life of the perishable product;

assigning, by the quality code engine, a predicted remaining shelf-life score to the perishable product based upon the predicted remaining shelf-life of the perishable product;

generating, by the quality code engine, a quality code for the perishable product, the quality code comprising the initial cooling score of the perishable product, the transportation temperature score of the perishable product and the predicted remaining shelf-life score of the perishable product;

determining one or more difference vectors between the quality code generated by the quality code engine and one or more observed qualities of the perishable product at the destination;

providing the one or more difference vectors as feedback to the quality code engine;

adjusting one or more of the plurality of parameters of the quality code engine based upon the feedback; and displaying the quality code of the perishable product on a user display.

20. The media of claim 19, further comprising;

determining a remaining shelf-life of the perishable product at the destination by using one or more of expert observations of one or more quality features of the perishable product performed at the destination, consumer observations of one or more quality features of the perishable product performed at the destination, and lab testing results of one or more quality features of the perishable product performed at the destination; and adjusting one or more of the initial cooling score and the transportation temperature score based upon the remaining shelf-life of the perishable product.

\* \* \* \* \*